United States Patent Office 3,448,792
Patented June 10, 1969

3,448,792
THERMAL CONVECTION CONDENSER AND METHOD OF USE
Willis Thompson Lawrence, Arlington, Mass., assignor, by mesne assignments, to Hooker Chemical Corporation, Niagara Falls, N.Y., a corporation of New York
Filed Nov. 7, 1966, Ser. No. 592,650
Int. Cl. F28d 1/06
U.S. Cl. 165—1                                     13 Claims

ABSTRACT OF THE DISCLOSURE

Rapid heat transfer from a heat exchange fluid to a cooler fluid is effected by disposing a condenser in the cooler fluid. The condenser is enshrouded by a tubular member which produces a unidirectional convection current and a chimney effect. The cooler fluid which is being heated passes over the condenser with increased flow, thereby extracting heat from the heat exchange coil (condenser) more rapidly than it would be extracted in the absence of the shroud.

---

This invention relates to a thermal convection condenser particularly useful for the removal of heat from a heat containing fluid while heating a liquid with the sensible heat of the fluid. More particularly, the present invention relates to a method and an apparatus for heating liquids utilizing the sensible heat of a heat exchange fluid increasing the heat transfer between said heat exchange fluid and the liquid being heated by channeling the convection currents originating from the heat exchange surface to thereby increase the flow of liquids contacting the heat exchange surfaces.

Water and various other organic and inorganic liquids have previously been heated utilizing a heating coil or other apparatus submerged within the water to be heated wherein a heat exchange fluid is passed through the heating coil. Recent innovations in the heat storage art have resulted in the desirability of rapid heat transfers from a high temperature heat storage composition, such as an alkali metal hydroxide composition maintained at temperatures up to 1200 degrees Fahrenheit, to the use such as the heating of water for domestic or commercial purposes. One method of extracting heat from the heat storage composition is by passing a heat exchange fluid such as water through a mass of heat storage material, heating the water to preferably superheated steam and subsequently extracting the heat from the superheated steam. To make the principle of heat storage most practical, a rapid means of transferring the heat from the superheated steam or other fluid to the water to be heated for end use is needed, preferably without the necessity of pumps, mechanical devices and the like.

It is an object of this invention to provide a means for increasing the rate of withdrawing the sensible heat from a heat exchange fluid in a heat exchanger contacting a liquid to be heated. It is another object of this invention to utilize the natural occurring convection currents created by the sensible heat of a hot heat exchange fluid in a heat exchanger in contact with a cooler liquid to thereby increase the rate of heat transfer to the liquid being heated. It is a further object of this invention to provide an apparatus and a method for improving the efficiency of heat transfer between a heat exchange fluid and the liquid being heated. These and other objects will become apparent to those skilled in the art from the description of the invention which follows.

In accordance with the invention, a thermal convection condenser is provided comprising an inner and a outer shield having positioned therein between a heat exchanger coil in a spaced relationship to said inner and outer shield. More specifically, the thermal convection condenser comprises an inner tubular shield member having positioned there around in a spaced relationship thereto a first heat exchanger coil, a second heat exchanger coil being positioned around said first heat exchanger coil in a spaced relationship thereto and an outer tubular shield member being positioned around said second heat exchanger coil in a spaced relationship thereto.

The invention will be more fully described by reference to the drawings in which.

Figure 1:
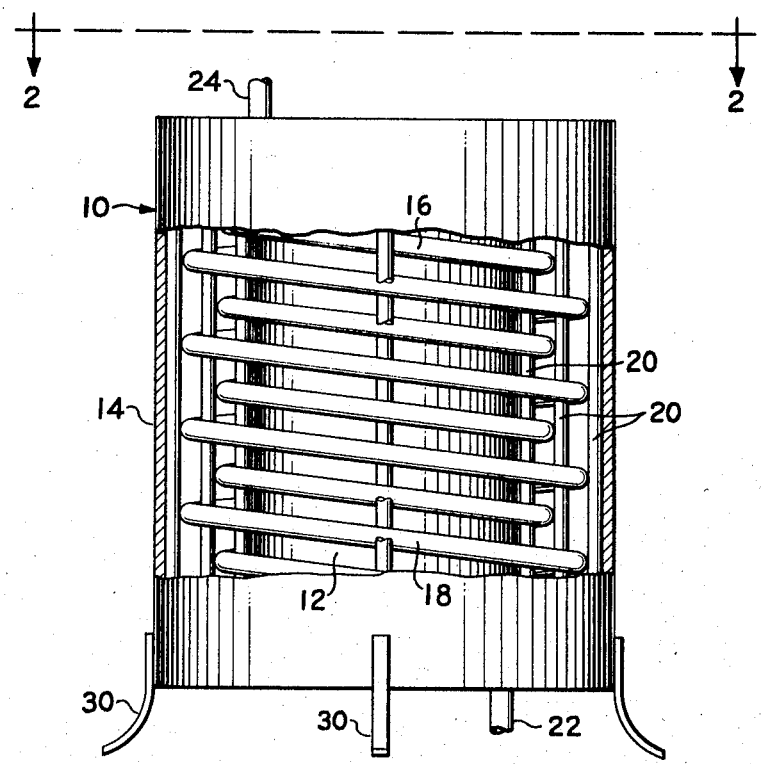
FIG. 1 is a partially exposed elevation of an apparatus in accordance with the present invention.

The heat condenser 10 of the present invention is of open end, preferably tubular configuration having an inner shield 12 and an outer shield 14 between which are positioned one or more heat exchange coils 16 and 18. In a preferred embodiment, at least two coils are used, one, a smaller coil 16 being positioned within a larger coil 18. The coils are held in a spaced relationship to each other and inner 12 and outer 14 shielding by spacers 20. Spacers 20 provide a vertical gap between the coils and shield means traversing the vertical height of the condenser thereby providing for the relatively free passage of liquid being heated from the bottom to the top of the conductor apparatus. This space can be varied with the particular size of the condenser, the liquid being heated and the like considerations. Normally, a gap of about $\frac{1}{16}$ to about 2 inches is preferred with about $\frac{1}{8}$ to $\frac{1}{2}$ inch being the most preferred distance.

Figure 2:
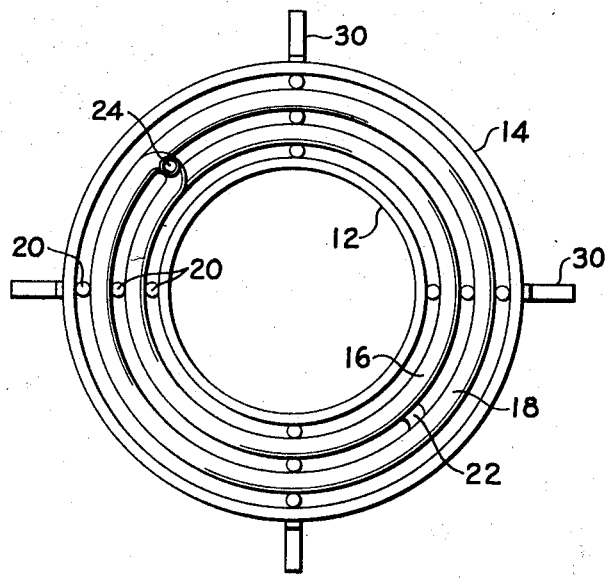
FIG. 2 is a top plan view of the apparatus of FIG. 1 along line 2—2.
Figure 4:
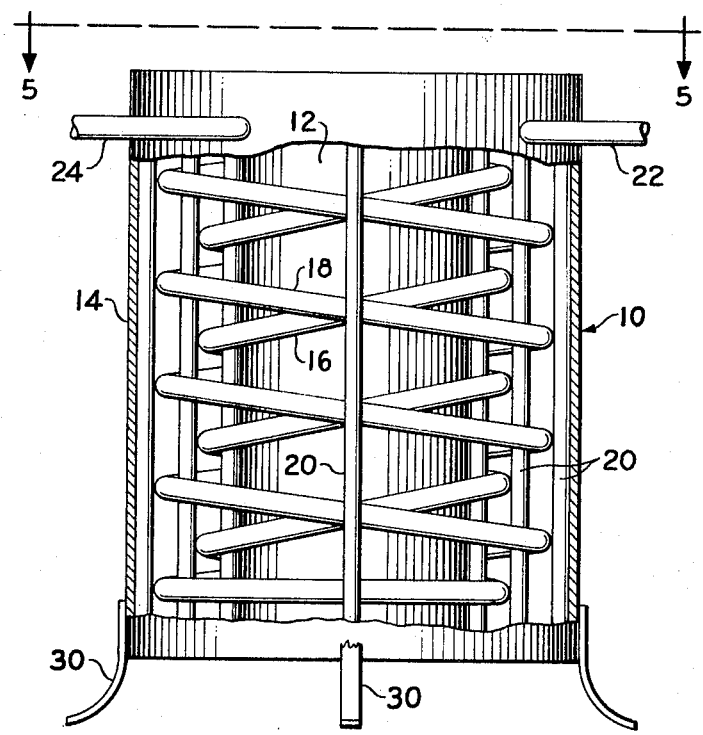
FIG. 4 is a partially exposed elevation of an apparatus in accordance with the present invention.
Figure 5:
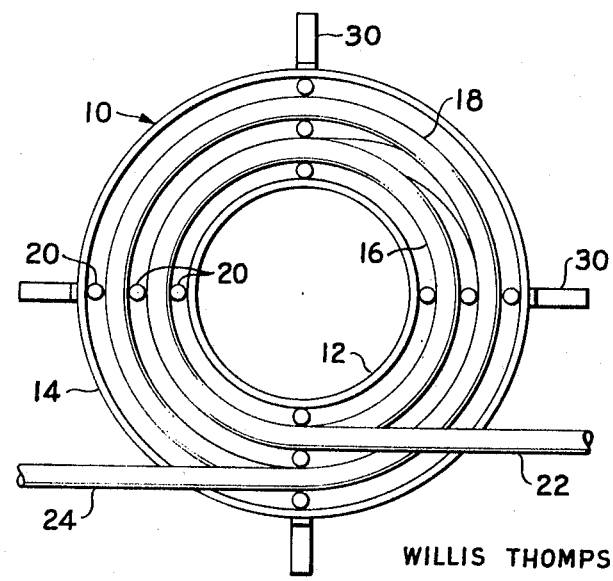
FIG. 5 is a top plan view of the apparatus of FIG. 4 along line 5—5.
Figure 6:
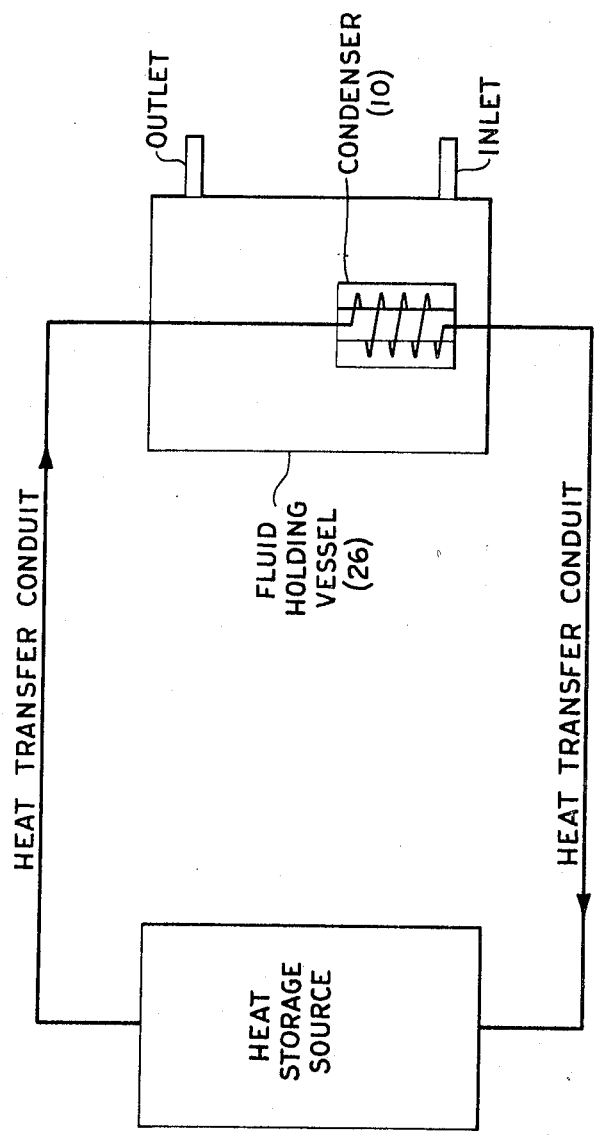
FIG. 6 is a flow sheet of the process utilizing the condenser of this invention.

The coils have an inlet 24 and an outlet 22 for the flow of fluids therethrough. When a plurality of coils is used, the coil can be continuous wherein the fluid enters one coil and passes downwardly through the descending coil to the bottom of the condenser and thence upwardly in a different diameter ascending coil, thereby having both the inlet and the outlet at the same level as shown in FIGURES 4 and 5, or more preferably as illustrated in FIGURES 1 and 2, the coils are independent of each other with separate flows of heat exchange fluid therethrough. Most preferably, the apparatus is constructed with means for the entrance of the heat exchange fluid in the top or highest portion of the heat exchange coil and exiting preferably at the bottom or lowest portion of the coils. As such, the passage of the heat exchange fluid is always in a decending flow. In most instances either design may be utilized. However, when the heat exchange fluid is superheated steam which is condensed to water, the configuration illustrated in FIGURES 1 and 2 has the desirable advantage of tending to drain condensed water from the heat exchanger.

The condenser apparatus of the present invention is preferably positioned in a liquid container 26 or tank containing a liquid such as water 28. The apparatus is preferably positioned near the bottom of container 26 on legs 30 or other support structures in an upright position thereby providing room for the free access and flow of the liquid to be heated to the bottom of condenser 10. In operation, the convection currents created by the liberation of the sensible heat of the heat exchange fluid are directed substantially unidirectionally upwardly by the shrouding around the heat exchange coils. The spacers 20 separating the shrouding from the coils provides for the free flow of cool water being drawn by the convection currents from the bottom of container 26. The open end shrouded design of the heat exchanger further provides, in addition to the unidirectional channeling of the convection currents, a chimney effect thereby accelerating the flow of water across the heat exchange coils and thereby more rapidly extracting the heat therefrom. Although a cylindrical configuration is preferred, it is readily recognized that other tubular configurations, such as rectangular, oval and the like can be used with correspondingly good results.

The present apparatus can be used to heat any liquid using wide range of heat exchange fluids which are liquid and/or gaseous at the operating temperatures. Preferably, the heat exchange fluid is superheated steam of a temperature of about 212 to about 900 degrees Fahrenheit or more. Best results are obtained when the temperature of the heat exchange fluid entering the condenser is measurably higher than the temperature of the liquid being heated.

The heat exchanger coil of the present invention is preferably constructed of metal, such as copper, aluminum, steel, nickel, chromium and the like and alloys thereof. The shrouding or shield can also be of the same or different metal as well as of suitable plastic material, such as reinforced polyester resins, phenolic resins, bisphenol resins, polycarbonates, and the like of suitable chemical and suitable physical characteristics to withstand the environment of the fluid being heated and the temperatures encountered. Normally, the entire apparatus including the spacers are constructed of metal.

The following example illustrates certain preferred embodiments of the present invention. Unless otherwise indicated, all parts and percentages used herein are by weight and all temperatures in the examples and claims are in degrees Fahrenheit.

EXAMPLE

Figure 3:
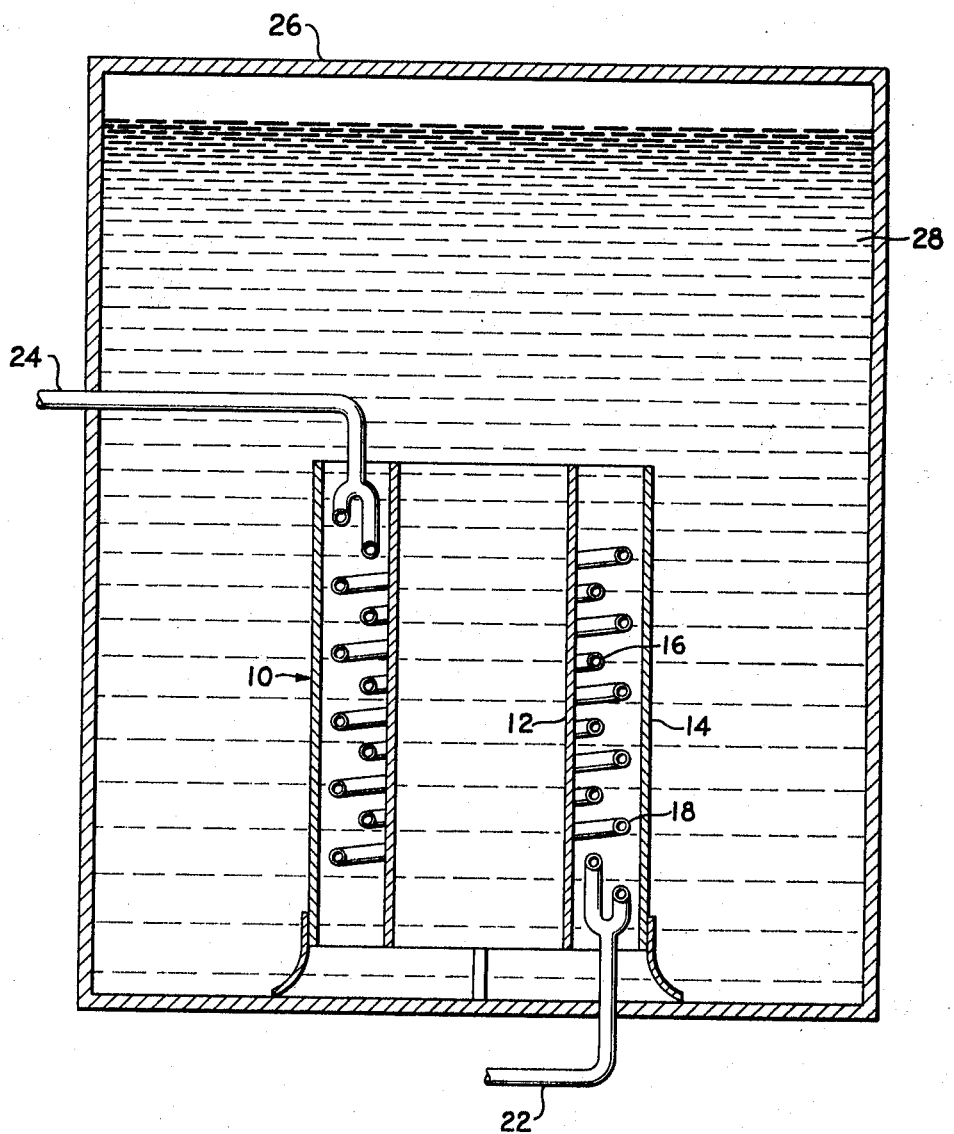
FIG. 3 is a sectional view of the apparatus of the present invention positioned within a body of liquid to be heated further illustrating the positioning of the condenser of the present invention.

The apparatus of the present invention was constructed in accordance with the drawings using copper tubes and stainless steel as the shielding material. The apparatus was placed in a container filled with water as shown in FIG. 3. Steam was generated by passing water at a temperature of about 70 degrees Fahrenheit through a heat storage composition maintained at a temperature of about 900 degrees Fahrenheit. The heat storage composition was comprised primarily of a substantially anhydrous sodium hydroxide composition containing about 89 percent sodium hydroxide, 8 percent sodium nitrate and about 2 percent sodium chloride, the remainder being primarily sodium carbonate. In passing the water through the heat storage composition in the heat exchange relationship thereto, the water was heated to superheated steam at a temperature of about 900 degrees Fahrenheit. Superheated steam exiting from the heat storage apparatus was passed into the condenser of the present invention with the condenser being submerged in a tank of water. The water in the tank had an original temperature of about 70 degrees Fahrenheit. The water was rapidly heated to a temperature of about 140 degrees Fahrenheit as the sensible heat of the steam was removed by condensing the superheated steam to water. Strong convection currents were generated by the heat differential. The shrouding of the heat exchanger coils caused a substantially unidirectional, upward flow of water across the heat exchange coils effecting a further and rapid circulation of water throughout the tank of water being heated.

The temperature to which the water was heated and the rate thereof was readily controlled by controlling the flow of steam to the condenser. Water condensed in the condenser was recirculated to the heat storage composition for further extraction of heat.

I claim:
1. A method for extracting heat from a heat storage system comprising heating a heat storage material to an elevated temperature, contacting a heat exchange fluid with the heat storage material in heat exchange relationship, heating the heat exchange fluid to an elevated temperature, passing the heated fluid through coiled condenser means in a cooling zone, surrounding said heated fluid in heat exchange relationship with a cooler liquid, generating convection current in said cooler liquid by means of substantially vertically disposed inner and outer shielding of a coiled conduit through which said heated fluid passes, passing said cooler liquid substantially unidirectionally upwardly in heat exchange contact with said heated fluid, utilizing the convection currents generated from said heat exchange contact as a means of circulating said cooler liquid and withdrawing heat from said heat exchange fluid and returning the heat exchange fluid to the heat storage system for further heat.

2. The process of claim 1 wherein the heat exchange fluid is water which is converted to steam when contacted with the heat storage material.

3. The process of claim 1 wherein the cooler liquid in said cooling zone is water.

4. A thermal convection condenser particularly suited for use with heat storage systems comprising inner and outer shield means and between said shield means, plural helical coils with loops of different diameter relative to an adjacent coil, said loops of adjacent coils being offset longitudinally of the passageway, formed by said shield means, said coils and shield means being separated by spacer means along said passageway.

5. The apparatus of claim 4 wherein said helical coils are concentrically positioned between said inner and outer shield means.

6. The apparatus of claim 4 wherein the shield means are cylindrical.

7. The apparatus of claim 4 in which support means are attached to said shield means to maintain said apparatus in an elevated position during use.

8. The apparatus of claim 4 in which said plural coils are joined by manifold means at the inlet and outlet of the condenser.

9. The apparatus of claim 4 in which at least one of said coils descends and at least one of said coils ascends, the diameter of the loops of the ascending coil being different from that of the descending coil.

10. An apparatus comprising a tank having an inlet and an outlet for introduction and removal of liquid and a thermal convection condenser spaced from the bottom of said tank comprising inner and outer shield means and between said shield means, plural helical coils with turnings of different diameter relative to an adjacent coil, said coils and shield means being separated by spacer means along the passageway formed by said shield means, said shield means being open at the top and bottom to permit and direct a flow of cool liquid substantially unidirectionally upward in heat exchange contact with said coil, said condenser being disposed in the lower region of said tank and being connected by conduit means to a heat storage source from which heat may be conveyed by a heat exchange fluid.

11. The apparatus of claim 10 in which said condenser contains plural heat exchange coils, one of which descends and one of which ascends, the diameter of the loops of the ascending coil being different from that of the descending coil, wherein said descending coil conveys heat exchange fluid from the heat source while the ascending coil is adapted to return heat exchange fluid to the heat source, both the descending and ascending coils of said condenser being connected to conduit means which enter and exit the tank holding liquid to be heated in its upper region.

12. The apparatus of claim 10 in which said condenser contains plural heat exchange coils of different diameter, said coils being connected to conduit means adapted to deliver heated transfer fluid from a heat source which enter said tank at a point above said condenser, and said coils being connected to conduit means adapted to return cooled transfer fluid to a heat source which exit said tank at a point below said condenser, manifold means being provided between said coils and said conduit means above and below said condenser.

13. A heat transfer system comprising a fluid holding tank in communication with a heat storage medium via a conduit for passage of a heat transfer fluid, said conduit being connected to a thermal convection condenser disposed in the lower region of said holding tank, said condenser comprising plural heat exchange coils positioned between inner and outer shield means spaced from said coils by spacer means, said shield means being open at the top and bottom to permit and direct a flow of cool liquid substantially unidirectionally upward in heat exchange contact with said coil.

References Cited

UNITED STATES PATENTS

| | | | |
|---|---|---|---|
| 953,607 | 3/1910 | Grantzdorffer | 165—108 |
| 1,076,444 | 10/1913 | Ord | 126—366 X |
| 1,437,540 | 12/1922 | Mojonnier | 165—108 |
| 1,730,293 | 10/1929 | Reed et al. | 165—108 |
| 1,821,278 | 9/1931 | Schuster | 165—108 X |
| 2,911,513 | 11/1959 | MacCracken | 219—39 |
| 248,796 | 10/1881 | Roos | 165—108 |
| 2,071,624 | 2/1937 | Graham | 165—108 |
| 2,160,898 | 6/1939 | Peff | 165—163 X |
| 2,199,216 | 4/1940 | Conti | 165—163 X |
| 2,640,686 | 6/1953 | Brown | 165—108 |
| 2,817,499 | 12/1957 | Harding et al. | 165—108 X |
| 2,933,885 | 4/1960 | Benedek et al. | 165—18 X |
| 2,936,741 | 5/1960 | Telkes | 126—400 X |
| 2,965,360 | 12/1960 | Brown | 165—108 X |

FOREIGN PATENTS

| | | |
|---|---|---|
| 139,788 | 7/1930 | Switzerland. |
| 53,679 | 9/1890 | Germany. |
| 565,165 | 11/1932 | Germany. |
| 196,435 | 6/1965 | Sweden. |

MEYER PERLIN, *Primary Examiner.*

A. W. DAVIS, *Assistant Examiner.*

U.S. Cl. X.R.

126—366, 400; 165—106, 108, 128, 163